United States Patent [19]

Sorensen

[11] Patent Number: 5,049,343
[45] Date of Patent: Sep. 17, 1991

[54] SEQUENTIALLY INJECTED MULTI-COMPONENT CORE-BACK INJECTION MOLDING

[76] Inventor: Jens O. Sorensen, P.O. Box 2274, Rancho Santa Fe, Calif. 92067

[21] Appl. No.: 539,855

[22] Filed: Jun. 18, 1990

[51] Int. Cl.$^5$ .................. B29C 45/12; B29C 45/16
[52] U.S. Cl. .................. 264/255; 264/297.2; 264/328.7; 264/328.8; 425/120; 425/129.1; 425/130; 425/572; 425/577; 425/588
[58] Field of Search .................. 264/255, 245, 297.2, 264/297.8, 328.7, 328.8, 328.11; 425/129.1, 120, 130, 577, 572, 588

[56] References Cited

U.S. PATENT DOCUMENTS

| | | | |
|---|---|---|---|
| 4,416,602 | 11/1983 | Neumeister | 425/130 |
| 4,726,758 | 2/1988 | Sekine et al. | 264/245 |
| 4,803,031 | 2/1989 | Ochs et al. | 264/255 |

FOREIGN PATENT DOCUMENTS 1061234 3/1967 United Kingdom .................. 425/130

*Primary Examiner*—Jill L. Heitbrink
*Attorney, Agent, or Firm*—Edward W. Callan

[57] ABSTRACT

A highly efficient and highly controllable method and an apparatus for core-back injection molding of multi-component plastic products. Core-back injection molding makes possible the injection of a first plastic material into a mold cavity, followed by retracting a barrier means, in order to enable injection of a second plastic material without separating any mold halves. The present invention enables very efficient injection molding because both injection units may be operated at the time, and the present invention enables very controlled injection because it is possible to inject only one half of the cavities by a specific injection unit at the same time, or even only one quarter of the cavities by a specific injection unit at the same time. The injection molding apparatus includes a first injection unit, a second injection unit, a right adjustable mold cavity with a first moveable barring means, a left adjustable mold cavity with a second moveable barring means, and a common standard clamping unit.

21 Claims, 2 Drawing Sheets

SEQUENTIALLY INJECTED MULTI-COMPONENT CORE-BACK INJECTION MOLDING

BACKGROUND OF THE INVENTION

The present invention generally pertains to a method and an apparatus for multi-cavity injection molding of plastic products and is particularly directed to a highly efficient and highly controllable method and an apparatus for core-back injection molding of multi-component plastic products. Core-back injection molding makes possible the injection of a first plastic material into a mold cavity, followed by retracting a barrier means, in order to enable injection of a second plastic material without separating any mold halves.

Heretofore core-back multi-cavity injection molding of multi-component plastic products were made by simultaneous injection of all cavities by a first plastic material and subsequently in time by simultaneous injection of all cavities by a second plastic material.

Examples of prior art core-back injection molding may be seen in the following U.S. Pat. Nos.: 4,157,883 to Mares; 4,508,676 to Sorensen; 4,726,758 to Sekine et al. and 4,840,760 to Oishi.

The problem with such injection molding is that it is very inefficient because only one injection unit is operating at the time, and it is not very controlled because all the cavities are filled at the same time, causing slow injection speeds and balancing problems in filling the individual cavities evenly.

The present invention enables very efficient injection molding because both injection units may be operated at the time, and the present invention enables very controlled injection because it is possible to inject only one half of the cavities by a specific injection unit at the same time, or even only one quarter of the cavities by a specific injection unit at the same time.

CROSS-REFERENCE TO RELATED APPLICATION

Reference is made to U.S. patent application 07/394,228 for: Sequentially Injected Multi-Component Shuttle Stack Molding by the same inventer.

SUMMARY OF THE INVENTION

A first aspect of the present invention provides a method of cyclic injection molding a first multi-component plastic product and a second multi-component plastic product in an injection molding apparatus comprising a first injection unit, a second injection unit, a right adjustable mold cavity with a primary right-mold-cavity side, a secondary right-mold-cavity side and a first moveable barring means, a left adjustable mold cavity with a primary left-mold-cavity side, a secondary left-mold-cavity side and a second moveable barring means, and a clamping unit, the method comprising the steps of:

(a) protracting the first barring means;
(b) retracting the second barring means;
(c) shutting the clamping unit to thereby combine the primary right-mold-cavity side and the secondary right-mold-cavity side of the right mold cavity, to thereby apply clamping force simultaneously on the right and left adjustable mold cavity;
(d) injecting a first portion of a first plastic material by the first injection unit into the right adjustable mold cavity, which has its first barring means in the protracted condition, to form a first component of the first multi-component product;
(e) injecting a first portion of a second plastic material by the second injection unit into the left adjustable mold cavity which has its second barring means in the retracted position, to form a second component of the second multi-component product while the left adjustable mold cavity encases a first component of the second multi-component product which has been injected into the left adjustable mold cavity in the previous cycle, whereby the first component of the second multi-component product combines with said injected first portion of the second plastic material to thereby cast said second multi-component product;
(f) opening the clamping unit in order to thereby separate the primary left-mold-cavity side and the secondary left-mold-cavity side of the left mold cavity, to open the left adjustable mold cavity;
(g) ejecting the second multi-component product;
(h) protracting the second barring means;
(i) retracting the first barring means;
(j) shutting the clamping unit to thereby combine the primary left-mold-cavity side and the secondary left-mold-cavity side of the left mold cavity, to thereby apply clamping force simultaneously on the right and left adjustable mold cavity;
(k) injecting a second portion of the first plastic material by the first injection unit into the left adjustable mold cavity, which has its second barring means in the protracted position, to form a first component of the second multi-component product and to encase the first component of the second multi-component product in the left mold cavity for employment in step (e) of the succeeding cycle;
(l) injecting a second portion of the second plastic material by the second injection unit into the right adjustable mold cavity which has its first barring means in the retracted position, to form a second component of said first multi-component product while the right adjustable mold cavity encases the first component of the first multi-component product which has been injected into the right adjustable mold cavity in step (d), whereby the first component of the first multi-component product combines with said injected second portion of the second plastic material to thereby cast said first multi-component product;
(m) opening the clamping unit in order to thereby separate the primary right-mold-cavity side and the secondary right-mold-cavity side of the right mold cavity, to open the right adjustable mold cavity;
(n) ejecting the first multi-component product.

A second aspect of the present invention provides a method of cyclic injection molding a first multi-component plastic product and a second multi-component plastic product in an injection molding apparatus comprising a first injection unit, a second injection unit, a common clamping unit, right, center and left molding blocks for defining a right adjustable mold cavity between the right and center molding blocks and a left adjustable mold cavity between the center and left molding blocks, a first left runner system for leading plastic molding material from the first injection unit to the left adjustable mold cavity, a first right runner system for leading plastic molding material from the first injection unit to the right adjustable mold cavity, a second left runner system for leading plastic molding material from the second injection unit to the left adjustable mold cavity, a second right runner system for leading plastic molding material from the second injection unit to the right adjustable mold cavity, the method comprising the steps of:

(a) adjusting the right mold cavity;
(b) adjusting the left mold cavity;
(c) shutting the common clamping unit to thereby apply clamping force with the common clamping unit on the right and left adjustable mold cavity;
(d) injecting a first portion of a first plastic material by the first injection unit into the right adjustable mold cavity, via the first right runner system, to form a first component of the first multi-component product;
(e) injecting a first portion of a second plastic material by the second injection unit into the left adjustable mold cavity, via the second left runner system, to form a second component of said second multi-component product while the left adjustable mold cavity encases a first component of the second multi-component product which has been injected into the left adjustable mold cavity in the previous cycle, whereby the first component of the second multi-component product combines with said injected first portion of the second plastic material to thereby cast said second multi-component product;
(f) opening the common clamping unit in order to open the left adjustable mold cavity;
(g) ejecting the second multi-component product;
(h) adjusting the left mold cavity;
(i) adjusting the right mold cavity;
(j) shutting the common clamping unit to thereby apply clamping force with the common clamping unit on the left and right adjustable mold cavity;
(k) injecting a second portion of the first plastic material by the first injection unit into the left adjustable mold cavity, via the first left runner system, to form a first component of the second multi-component product and to encase the first component of the second multi-component product in the left mold cavity for employment in step (e) of the succeeding cycle;
(l) injecting a second portion of the second plastic material by the second injection unit into the right adjustable mold cavity, via the second right runner system, to form a second component of said first multi-component product while the right adjustable mold cavity encases the first component of the first multi-component product which has been injected into the right adjustable mold cavity in step (d), whereby the first component of the first multi-component product combines with said injected second portion of the second plastic material to thereby cast said first multi-component product;
(m) opening the common clamping unit in order to open the right adjustable mold cavity;
(n) ejecting the first multi-component product.

A third aspect of the present invention provides an apparatus for cyclic injection molding a first multi-component plastic product and a second multi-component plastic product comprising a first injection unit, a second injection unit, a right adjustable mold cavity with a primary right-mold-cavity side, a secondary right-mold-cavity side and a first moveable barring means, a left adjustable mold cavity with a primary left-mold-cavity side, a secondary left-mold-cavity side and a second moveable barring means, and means for protracting the first barring means;
means for retracting the second barring means;
means for shutting the clamping unit to thereby combine the primary right-mold-cavity side and the secondary right-mold-cavity side of the right mold cavity, to thereby apply clamping force simultaneously on the right and left adjustable mold cavity;
means for injecting a first portion of a first plastic material by the first injection unit into the right adjustable mold cavity, when the right adjustable mold cavity has its first barring means in the protracted condition;
means for injecting a first portion of a second plastic material by the second injection unit into the left adjustable mold cavity when the second injection unit has its second barring means in the retracted position;
means for opening the clamping unit in order to thereby separate the primary left-mold-cavity side and the secondary left-mold-cavity side of the left mold cavity, to open the left adjustable mold cavity;
means for ejecting the second multi-component product;
means for protracting the second barring means;
means for retracting the first barring means;
means for shutting the clamping unit to thereby combine the primary left-mold-cavity side and the secondary left-mold-cavity side of the left mold cavity, to apply clamping force simultaneously on the right and left adjustable mold cavity;
means for injecting a second portion of the first plastic material by the first injection unit into the left adjustable mold cavity, when the first injection unit has its second barring means in the protracted position;
means for injecting a second portion of the second plastic material by the second injection unit into the right adjustable mold cavity when the right adjustable mold cavity has its first barring means in the retracted position;
means for opening the clamping unit in order to thereby separate the primary right-mold-cavity side and the secondary right-mold-cavity side of the right mold cavity, to open the right adjustable mold cavity;
means for ejecting the first multi-component product.

A fourth aspect of the present invention provides an apparatus for cyclic injection molding a first multi-component plastic product and a second multi-component plastic product comprising a first injection unit, a second injection unit, a common clamping unit, right, center and left molding blocks for defining a right adjustable mold cavity between the right and center molding blocks and a left adjustable mold cavity between the center and left molding blocks, the center block comprising a first left runner system for leading plastic molding material from the first injection unit to the left adjustable mold cavity, a first right runner system for leading plastic molding material from the first injection unit to the right adjustable mold cavity, a second left runner system for leading plastic molding material from the second injection unit to the left adjustable mold cavity, a second right runner system for leading plastic molding material from the second injection unit to the right adjustable mold cavity, and means for adjusting the right mold cavity;
    means for adjusting the left mold cavity;
    means for shutting the common clamping unit in order to apply clamping force with the common clamping unit on the right and left adjustable mold cavity;
    means for injecting a first portion of a first plastic material by the first injection unit into the right adjustable mold cavity, via the first right runner system;
    means for injecting a first portion of a second plastic material by the second injection unit into the left adjustable mold cavity, via the second left runner system;
    means for opening the common clamping unit in order to open the left adjustable mold cavity;
    means for ejecting the second multi-component product;
    means for readjusting the left mold cavity;
    means for readjusting the right mold cavity;
    means for injecting a second portion of the first plastic material by the first injection unit into the left adjustable mold cavity, via the first left runner system;
    means for injecting a second portion of the second plastic material by the second injection unit into the right adjustable mold cavity, via the second right runner system;
    means for opening the common clamping unit in order to open the right adjustable mold cavity;
    means for ejecting the first multi-component product.

In each of the four above mentioned aspects of the invention there may be only one injection unit, whereby the first injection unit and the second injection unit is the same injection unit.

DESCRIPTION OF THE PREFERRED EMBODIMENTS

Figure 1:
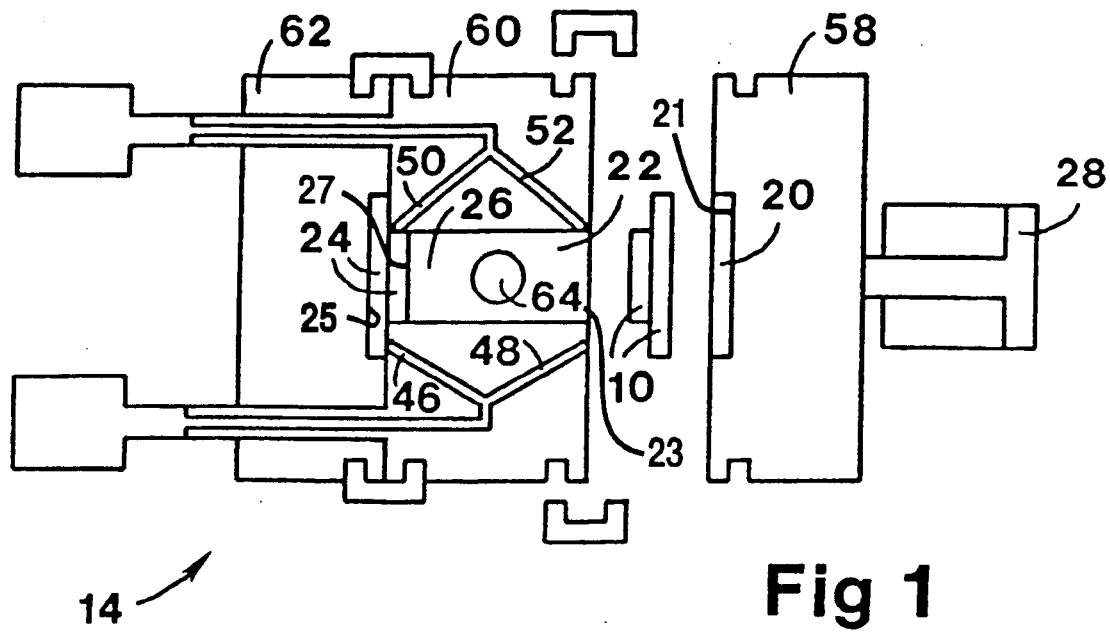
FIGS. 1 through 4 shows within a molding cycle four chronological top sectional views of an injection molding apparatus according to the invention used to operate the method of the invention.
Figure 2:
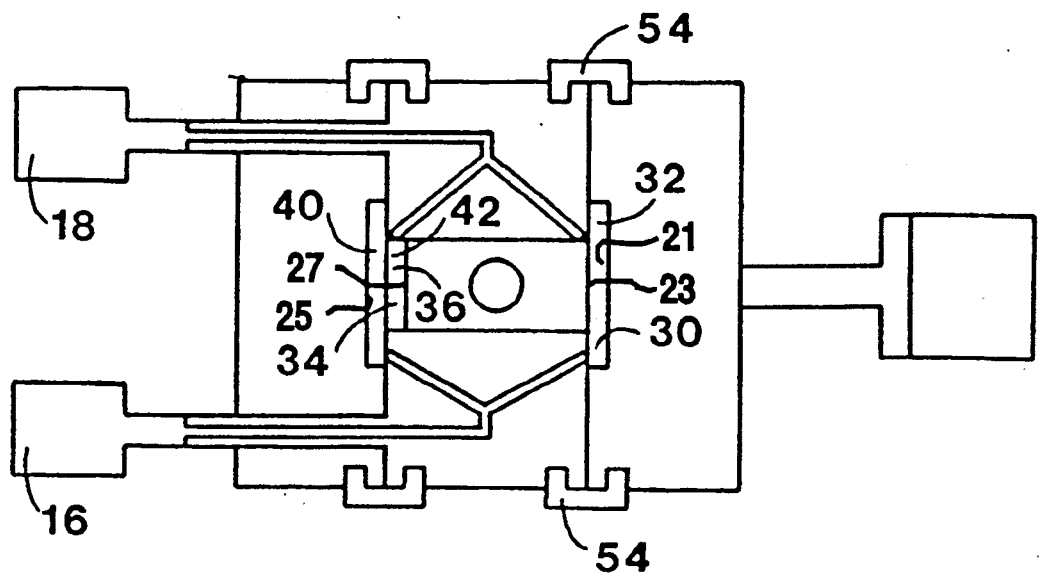
Figure 3:
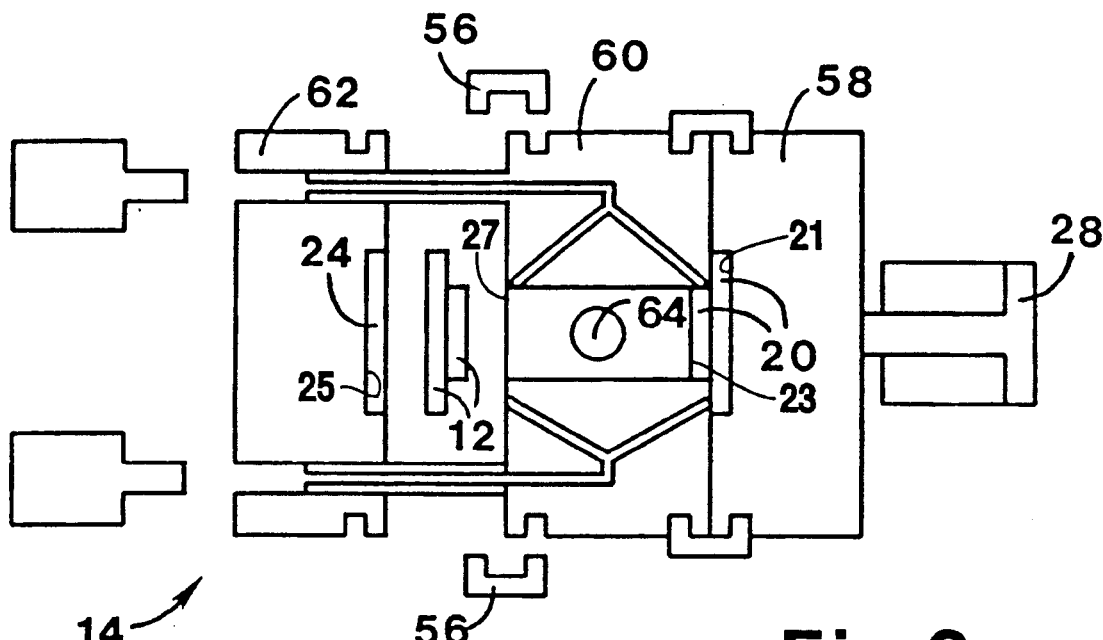
Figure 4:
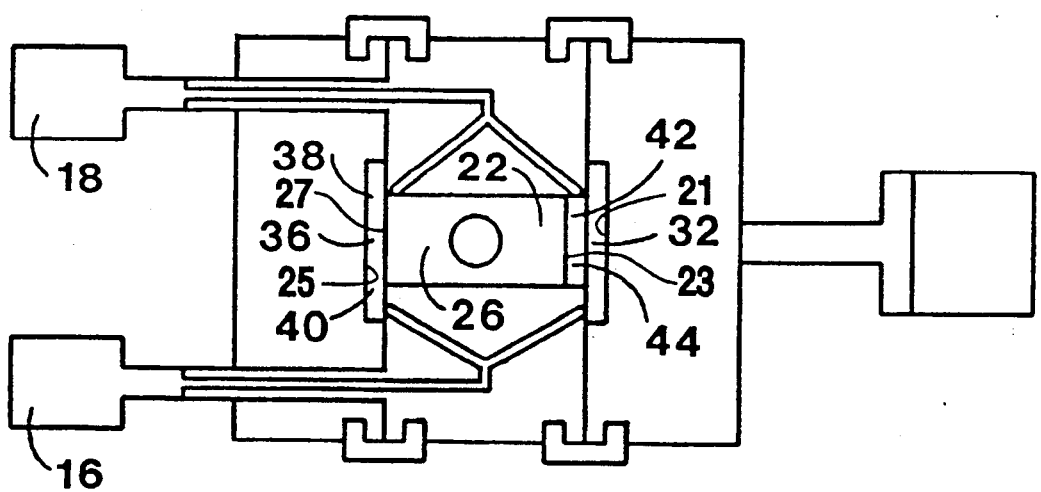

Referring to FIGS. 1 through 4. Shown is a first preferred embodiment of the invention depicting an apparatus 14 for cyclic injection molding a first multi-component plastic product 10 and a second multi-component plastic product 12 comprising a first injection unit 16, a second injection unit 18, a right adjustable mold cavity 20 with a first moveable barring means 22, a left adjustable mold cavity 24 with a second moveable barring means 26, and a hydraulic piston 64 for protracting and retracting the first and second barring means 22, 26, a common clamping unit 28 to apply clamping force simultaneously on the right and left adjustable mold cavity 20, 24, and for opening and closing the right and left adjustable mold cavity 20, 24, right, center and left molding blocks 58, 60, 62 respectively for defining the right adjustable mold cavity 20, between the right and center molding blocks 58, 60 and the left adjustable mold cavity 24, between the center and left molding blocks 60, 62, right locking means 54 for locking the right molding block 58 to the center molding block 60, left locking means 56 for locking the center molding block 60 to the left molding block 62, a first left runner system 46 for leading plastic molding material from the first injection unit 16 to the left adjustable mold cavity 24, a first right runner system 48 for leading plastic molding material from the first injection unit 16 to the right adjustable mold cavity 20, a second left runner system 50 for leading plastic molding material from the second injection unit 18 to the left adjustable mold cavity 24, and a second right runner system 52 for leading plastic molding material from the second injection unit 18 to the right adjustable mold cavity 20.

The right adjustable mold cavity 20 has a primary right-mold-cavity side 21 and a secondary right-mold-cavity side 23. The left adjustable mold cavity 24 has a primary left-mold-cavity side 25 and a secondary left-mold-cavity side 27.

Referring again to FIGS. 1 through 4. The operation of the first preferred embodiment is as follows:

The first moveable barrier means 22 is protracted by the hydraulic piston 64 and the second moveable barrier means 26 is retracted simultaneously by the same hydraulic piston 64 thereby adjusting the right and the left mold cavity 20, 24. In other embodiments of the invention it is possible to use separate protracting and retracting means to move the different barrier means independently and at different times.

Then the clamping unit 28 is shut by moving relatively the right and left molding blocks 58, 62 together, to thereby combine the primary right-mold-cavity side 21 and the secondary right-mold-cavity side 23 of the right mold cavity 20, in order to apply clamping force simultaneously on the right and adjustable mold cavity 20, 24. The right and center molding blocks 58, 60, are locked together by the right locking means 54. A first portion of a first plastic material 30 is injected by the first injection unit 16 into the right adjustable mold cavity 20, which has its first barring means 22 in the protracted condition, to form a first component of the first multi-component product 32. Simultaneously a first portion of a second plastic material 42 is injected by the second injection unit 18 into the left adjustable mold cavity 24 which has its second barring means 26 in the retracted position, to form a second component of the second multi-component product 36 while the left adjustable mold cavity 24 encases a first component of the second multi-component product 40 which has been injected into the left adjustable mold cavity 24 in the previous cycle, whereby the first component of the second multi-component product 40 combines with said injected first portion of the second plastic material 34 to thereby cast said second multi-component product 12.

The center and left molding blocks 60, 62 are unlocked by the left locking means 56 and the clamping unit 28 is then activated in order to open the left adjustable mold cavity 24, to thereby separate the primary left-mold-cavity side 25 and the secondary left-mold-cavity side 27 of the left mold cavity 24, by moving relatively the right and left molding blocks 58, 62 apart, so that the second multi-component product 12 may be ejected.

Hereafter the second moveable barrier means 26 is protracted by the hydraulic piston 64 and the first moveable barrier means 22 is retracted simultaneously by the same hydraulic piston 64 thereby adjusting the right and the left mold cavity 20, 24.

Then the clamping unit 28 is shut by moving relatively the right and left molding blocks 58, 62 together, to thereby combine the primary left-mold-cavity side 25 and the secondary left-mold-cavity side 27 of the left old cavity 24, in order to apply clamping force simultaneously on the right and left adjustable mold cavity 20, 24. The center and left molding blocks 60, 62 are locked together by the left locking means 56. A second portion of a first plastic material 38 is injected by the first injection unit 16 into the left adjustable mold cavity 24, which has its second barring means 26 in the protracted condition, to form a first component of the second multi-component product 36 to thereby encase the first component of the second multi-component product 40 in the left mold cavity 24 for employment in the succeeding cycle. Simultaneously a second portion of a second plastic material 42 is injected by the second injection unit 18 into the right adjustable mold cavity 20 which has its first barring means 22 in the retracted position, to form a second component of the first multi-component product 44 while the right adjustable mold cavity 20 encases a first component of the first multi-component product 32 which has been injected into the right adjustable mold cavity 20 previously, whereby the first component of the first multi-component product 32 combines with said injected second portion of the second plastic material 42 to thereby cast said first multi-component product 10.

The right and center molding blocks 58, 60 are unlocked by the right locking means 54 and the clamping unit 28 is then activated in order to open the right adjustable mold cavity 20 to thereby separate the primary right-mold-cavity side 21 and the secondary right-mold-cavity side 23 of the right mold cavity 20, by moving relatively the right and left molding blocks 58, 62 apart, so that the first multi-component product 10 may be ejected. The first multi-component product 10 is identical to the second multi-component product 12, but in other embodiments of the invention it is possible to mold different products in the right mold cavity 20 and the left mold cavity 24, for example a container and a lid of a multi-walled product with an oxygen barrier in one of the walls, or an A side and a B side of an audio cassette, or a front bumper and a rear bumper for an automobile.

While the above description contains many specificities, these should not be construed as limitations on the scope of the invention, but rather as an exemplification of the preferred embodiment thereof. Many other variations of the invention are possible.

For example is it not necessary that the first mold cavity and the second mold cavity are in a stacked configuration as shown in the illustrated preferred embodiment. In a second preferred embodiment of the present invention the first and second mold cavities may for example be placed side by side, the first and second mold cavity alternately opening every half molding cycle as described in the summary of the invention. For a description of a suitable locking means reference is made to for example U.S. Pat. No. 4,005,964 to Bishop.

Of particular interest is a third preferred embodiment of the present invention which has a first and a second mold cavity in a side by side configuration, operating like the second preferred embodiment; and a third and fourth mold cavity also in a side by side configuration and operating like the second embodiment. The first and second mold cavity being on a left side in a stacked configuration in relation to the third and fourth mold cavity being on a right side. The left side opening one quarter cycle displaced in time in relation to the right side. For a description of a suitable cycle reference is made to for example U.S. Pat. Nos. 4,400,341 and 4,464,327 both to Sorensen.

In this third preferred embodiment both injection units inject every quarter cycle, each into a different mold cavity, and one different mold cavity opens to eject a multi-component product every quarter cycle.

In the above description, and the description following hereafter, whenever a specific mold cavity is mentioned like for example the left mold cavity or the third mold cavity, it is possible to place a number of individual mold cavities in place of such mentioned mold cavity, so that an apparatus with a very large number of mold cavities are possible within the limitations of the invention.

A fourth preferred embodiment of the present invention has a first and a second mold cavity in a stacked configuration, operating like the first preferred embodiment; and a third and fourth mold cavity also in a stacked configuration and operating like the first embodiment. The first and second mold cavity being on a left side in a stacked configuration in relation to the third and fourth mold cavity being on a right side, in this way all the four cavities are stacked on each other. The left stacked side opening one quarter cycle displaced in time in relation to the right stacked side.

In this fourth preferred embodiment both injection units inject every quarter cycle, each into a different mold cavity, and one different mold cavity opens to eject a multi-component product every quarter cycle.

In certain cases it may be advantageous to operate the apparatus herein described in a synchronous manner in relation to injection and opening of the mold cavities, but then other advantages such as molding efficiency and injection control may be lost.

The runner systems leading from the injection units to the mold cavities may be direct whereby the injection unit moves from runner orifice to runner orifice whenever a particular cavity needs to be filled or such runner systems may be bifurcated of multi-branched whereby movement of the injection unit may be reduced or eliminated.

There may be valves in the runner systems for leading plastic material to specific mold cavities and blocking access to other mold cavities. Valves may also be used to create hold pressure and when depressurizing a particular runner system or section of such runner system.

No valves have been shown in the illustrated first preferred embodiment. This is because when the first plastic is injected the moveable barring means obstruct flow into one of the mold cavities and when the second plastic is injected the firstly injected plastic obstructs flow into the other mold cavity.

Mold cavities in a stacked configuration as referred to in the present specification may be either in a stack mold, sandwich mold configuration or in a multi-platen machine configuration wherein there is at least one extra moveable platen between a stationary platen and a moveable platen of a standard injection molding machine. A very important feature of the present invention is that it can be carried out using standard injection molding machines with a standard clamping unit. There may be any number of injection units with different colors and/or plastic materials. These injection units do not need to be aligned axially as in the first preferred embodiment, but may be aligned in any direction. The invention is very suitable for the injection molding of four color rear lights for automobiles, in which case four injection units are necessary.

In case of four colors there needs to be four runner systems leading to each cavity. In order to fill only a part of an adjustable mold cavity, the part of the cavity to be filled by plastic material of a particular color may be confined by rotating or moveable barrier means, earlier injected hardened plastic and/or exchangeable mold sections which are rotated or shuttled into their temporary positions.

In order to start up the cycles of the present invention, one way is to place or leave components from a previous cycle in the respective mold cavities. Another way is to inject a larger quantity of plastic material into the mold cavities which have missing plastic components in the first cycle.

I claim:

1. A method of cyclic injection molding a first multi-component plastic product and a second multi-component plastic product in an injection molding apparatus comprising a first injection unit, a second injection unit, a right adjustable mold cavity with a primary right-mold-cavity side, a secondary right-mold-cavity side and a first moveable barring means, a left adjustable mold cavity with a primary left-mold-cavity side, a secondary left-mold-cavity side and a second moveable barring means, and a clamping unit, the method comprising the steps of:

(a) protracting the first barring means;
   (b) retracting the second barring means;
   (c) shutting the clamping unit to thereby combine the primary right-mold-cavity side and the secondary right-mold-cavity side of the right mold cavity, to thereby apply clamping force simultaneously on the right and left adjustable mold cavities;
   (d) injecting a first portion of a first plastic material by the first injection unit into the right adjustable mold cavity, which has its first barring means in the protracted condition, to form a first component of the first multi-component product;
   (e) injecting a first portion of a second plastic material by the second injection unit into the left adjustable mold cavity which has its second barring means in the retracted position, to form a second component of said second multi-component product while the left adjustable mold cavity encases a first component of the second multi-component product which has been injected into the left adjustable mold cavity in the previous cycle, whereby the first component of the second multi-component product combines with said injected first portion of the second plastic material to thereby cast said second multi-component product;
   (f) opening the clamping unit in order to thereby separate the primary left-mold-cavity side and the secondary left-mold cavity side of the left mold cavity, to open the left adjustable mold cavity;
   (g) ejecting the second multi-component product;
   (h) protracting the second barring means;
   (i) retracting the first barring means;
   (j) shutting the clamping unit to thereby combine the primary left-mold cavity side and the secondary left-mold-cavity side of the left mold cavity, tot hereby apply clamping force simultaneously on the right and left adjustable mold cavities;
   (k) injecting a second portion of the first plastic material by the first injection unit into the left adjustable mold cavity, which has its second barring means in the protracted position, to form a first component of the second multi-component product and to encase the first component of the second multi-component product in the left mold cavity for employment in step (e) of the succeeding cycle;
   (l) injecting a second portion of the second plastic material by the second injection unit into the right adjustable mold cavity which has its first barring means in the retracted position, to form a second component of said first multi-component product while the right adjustable mold cavity encases the first component of the first multi-component product which has been injected into the right adjustable mold cavity to step (d), whereby the first component of the first multi-component product combines with said injected second portion of the second plastic material to thereby cast said first multi-component product;
   (m) opening the clamping unit in order to thereby separate the primary right-mold-cavity side and the secondary right-mold-cavity side of the right mold cavity, to open the right adjustable mold cavity; and
   (n) ejecting the first multi-component product.

2. A method according to claim 1, wherein the first multi-component product is essentially identical to the second multi-component product.

3. A method according to claim 1, wherein step (a) and step (b) take place at approximately the same time and wherein step (h) and step (i) take place at approximately the same time.

4. A method according to claim 1, wherein step (a) and step (b) take place in the period after the beginning of step (m) of the previous molding cycle and before the termination step (c) and wherein step (h) and step (i) take place in the period after the beginning of step (f) and before the termination of step (j).

5. A method of cyclic injection molding a first multi-component plastic product and a second multi-component plastic product in an injection molding apparatus comprising right, center and left molding blocks for defining a right adjustable mold cavity between the right and center molding blocks and a left adjustable mold cavity between the center and left molding blocks, a first injection unit, a second injection unit, a first moveable barring means for the right adjustable mold cavity, a second moveable barring means for the left adjustable mold cavity, and a clamping unit, the method comprising the steps of:

(a) protracting the first barring means;
   (b) retracting the second barring means;
   (c) shutting the clamping unit to thereby apply clamping force simultaneously on the right and left adjustable mold cavities;
   (d) injecting a first portion of a first plastic material by the first injection unit into the right adjustable mold cavity, which has its first barring means in the protracted condition, to form a first component of the first multi-component product;
   (e) injecting a first portion of a second plastic material by the second injection unit into the left adjustable mold cavity which has its second barring means in the retracted position, to form a second component of said second multi-component product while the left adjustable mold cavity encases a first component of the second multi-component product which has been injected into the left adjustable mold cavity in the previous cycle, whereby the first component of the second multi-component product combines with said injected first portion of the second plastic material to thereby cast said second multi-component product;
(f) opening the clamping unit in order to open the left adjustable mold cavity;
(g) ejecting the second multi-component product;
(h) protracting the second barring means;
(i) retracting the first barring means;
(j) shutting the clamping unit to thereby apply clamping force simultaneously on the right and left adjustable mold cavities;
(k) injecting a second portion of the first plastic material by the first injection unit into the left adjustable mold cavity, which has its second barring means in the protracted position, to form a first component of the second multi-component product and to encase the first component of the second multi-component product in the left mold cavity for employment in step (e) of the succeeding cycle;
(l) injecting a second portion of the second plastic material by the second injection unit into the right adjustable mold cavity which has its first barring means in the retracted position, to form a second component of said first multi-component product while the right adjustable mold cavity encases the first component of the first multi-component product which has been injected into the right adjustable cold cavity in step (d), whereby the first component of the first multi-component product combines with said injected second portion of the second plastic material to thereby cast said first multi-component product;
(m) opening the clamping unit in order to open the right adjustable mold cavity; and
(n) ejecting the first multi-component product, and wherein step (c) comprises the step of:
(o) moving relatively the right and left molding blocks together;
wherein step (f) comprises the step of:
(p) moving relatively the right and left molding blocks apart;
wherein step (j) comprises the step of:
(q) moving relatively the right and left molding blocks together; and
wherein step (m) comprises the step of:
(r) moving relatively the right and left molding blocks apart.

6. A method according to claim 5, wherein the injection molding apparatus comprises right locking means for locking the right molding block to the center molding block and left locking means for locking the center molding block to the left molding block, and wherein the method subsequent to step (c) comprises the step of:
(s) locking the right and center molding blocks together; wherein the method prior to step (f) comprises the step of:
(t) unlocking the center and left molding blocks; wherein the method subsequent to step (j) comprises the step of:
(u) locking the center and left molding blocks together; and wherein the method prior to step (m) comprises the step of:
(v) unlocking the right and center molding blocks.

7. A method of cyclic injection molding a first multi-component plastic product and a second multi-component plastic product in an injection molding apparatus comprising a first injection unit, a second injection unit, a right adjustable mold cavity with a first moveable barring means, a left adjustable mold cavity with a second moveable barring means, and a clamping unit, the method comprising the steps of:
(a) protracting the first barring means;
(b) retracting the second barring means;
(c) shutting the clamping unit to thereby apply clamping force simultaneously on the right and left adjustable mold cavity;
(d) injecting a first portion of a first plastic material by the first injection unit into the right adjustable mold cavity, which has its first barring means in the protracted condition, to form a first component of the first multi-component product;
(e) injecting a first portion of a second plastic material by the second injection unit into the left adjustable mold cavity which has its second barring means in the retracted position, to form a second component of said second multi-component product while the left adjustable mold cavity encases a first component of the second multi-component product which has been injected into the left adjustable mold cavity in the previous cycle, whereby the first component o the second multi-component product combines with said injected first portion of the second plastic material to thereby cast said second multi-component product;
(f) opening the clamping unit in order to open the left adjustable mold cavities;
(g) ejecting the second multi-component product;
(h) protracting the second barring means;
(i) retracting the first barring means;
(j) shutting the clamping unit to thereby apply clamping force simultaneously on the right and left adjustable mold cavities;
(k) injecting a second portion of the first plastic material by the first injection unit into the left adjustable mold cavity, which has its second barring means in the protracted position, to form a first component of the second multi-component product and to encase the first component of the second multi-component product in the left mold cavity for employment in step (e) of the succeeding cycle;
(l) injecting a second portion of the second plastic material by the second injection unit into the right adjustable mold cavity which has its first barring means in the retracted position, to form a second component of said first multi-component product while the right adjustable mold cavity encases the first component of the first multi-component product which has been injected into the right adjustable mold cavity in step (d), whereby the first component of the first multi-component product combines with said injected second portion of the second plastic material to thereby cast said first multi-component product;
(m) opening the clamping unit in order to open the right adjustable mold cavity; and
(n) ejecting the first multi-component product,
wherein step (d) and step (e) take place at approximately the same time and wherein step (k) and step (l) take place at approximately the same time.

8. A method of cyclic injection molding a first multi-component plastic product and a second multi-component plastic product in an injection molding apparatus comprising a first injection unit, a second injection unit, a common clamping unit, right, center and left molding blocks for defining a right adjustable mold cavity between the right and center molding blocks and a left adjustable mold cavity between the center and left molding blocks, a first left runner system for leading plastic molding material from the first injection unit to the left adjustable mold cavity, a first right runner system for leading plastic molding material from the first injection unit to the right adjustable mold cavity, a second left runner system for leading plastic molding material from the second injection unit to the left adjustable mold cavity, a second right runner system for leading plastic molding material from the second injection unit to the right adjustable mold cavity, the method comprising the steps of:

(a) adjusting the right mold cavity;
(b) adjusting the left mold cavity;
(c) shutting the common clamping unit to thereby apply clamping force with the common clamping unit on the right and left adjustable mold cavities;
(d) injecting a first portion of a first plastic material by the first injection unit into the right adjustable mold cavity, via the first right runner system, to form a first component of the first multi-component product;
(e) injecting a first portion of a second plastic material by the second injection unit into the left adjustable mold cavity, via the second left runner system, to form a second component of the second multi-component product while the left adjustable mold cavity encases a first component of the second multi-component product which has been injected into the left adjustable mold cavity in the previous cycle, whereby the first component of the second multi-component product combines with said injected first portion of the second plastic material to thereby cast said second multi-component product;
(f) opening the common clamping unit in order to open the left adjustable mold cavity;
(g) ejecting the second multi-component product;
(h) adjusting the left mold cavity;
(i) adjusting the right mold cavity;
(j) shutting the common clamping unit to thereby apply clamping force with the common clamping unit on the left and right adjustable mold cavities;
(k) injecting a second portion of the first plastic material by the first injection unit into the left adjustable mold cavity, via the first left runner system, to form a first component of the second multi-component product and to encase the first component of the second multi-component product in the left mold cavity for employment in step (e) of the succeeding cycle;
(l) injecting a second portion of the second plastic material by the second injection unit into the right adjustable mold cavity, via the second right runner system, to form a second component of said first multi-component product while the right adjustable mold cavity encases the first component of the first multi-component product which has been injected into the right adjustable mold cavity in step (d), whereby the first component of the first multi-component product combines with said injected second portion of the second plastic material to thereby cast said first multi-component product;
(m) opening the common clamping unit in order to open the right adjustable mold cavity; and
(n) ejecting the first multi-component product.

9. A method according to claim 8, wherein step (a) and step (b) take place in the period after the beginning of step (m) of the previous molding cycle and before the termination step (c) and wherein step (h) and step (i) take place in the period after the beginning of step (f) and before the termination of step (j).

10. A method according to claim 8, wherein the injection molding apparatus comprises right locking means for locking the right molding block to the center molding block and left locking means for locking the center molding block to the left molding block, and wherein step (c) comprises the step of:
(o) locking the right and center molding blocks together; wherein step (f) comprises the step of:
(p) unlocking the center and left molding blocks; wherein step (j) comprises the step of:
(q) locking the center and left molding blocks together; and wherein step (m) comprises the step of:
(r) unlocking the right and center molding blocks.

11. A method of cyclic injection molding a first multi-component plastic product and a second multi-component plastic product in an injection molding apparatus comprising an injection unit, a right adjustable old cavity with a primary right-mold-cavity side, a secondary right-mold-cavity side and a first moveable barring means, a left adjustable mold cavity with a primary left-mold-cavity side, a secondary left-mold-cavity side and a second moveable barring means, and a clamping unit, the method comprising the steps of:

(a) protracting the first barring means;
(b) retracting the second barring means;
(c) shutting the clamping unit to thereby combine the primary right-mold-cavity side and the secondary right-mold-cavity side of the right mold cavity, to thereby apply clamping force simultaneously on the right and left adjustable mold cavities;
(d) injecting a first portion of a first plastic material by the injection into the right adjustable mold cavity, which has its first barring means in the protracted condition, to form a first component of the first multi-component product;
(e) injecting a first portion of a second plastic material by the injection unit into the left adjustable mold cavity which has its second barring means in the retracted position, to form a second component of said second multi-component product while the left adjustable mold cavity encases a first component of the second multi-component product which has been injected into the left adjustable mold cavity in the previous cycle, whereby the first component of the second multi-component product combines with said injected first portion of the second plastic material to thereby cast said second multi-component product;
(f) opening the clamping unit in order to thereby separate the primary left-mold-cavity side and the secondary left-mold cavity side of the left mold cavity, to open the left adjustable mold cavity;
(g) ejecting the second multi-component product;
(h) protracting the second barring means;
(i) retracting the first barring means;
(j) shutting the clamping unit to thereby combine the primary left-mold-cavity side and the secondary left-mold-cavity side of the left mold cavity, to thereby apply clamping force simultaneously on the right and left adjustable mold cavities;
(k) injecting a second portion of the first plastic material by the first injection unit into the left adjustable mold cavity, which has its second barring means in the protracted position, to form a first component of the second multi-component product and to encase the first component of the second multi-component product in the left mold cavity for employment in step (e) of the succeeding cycle;

(l) injecting a second portion of the second plastic material by the second injection unit into the right adjustable old cavity which has its first barring means in the retracted position, to form a second component of said first multi-component product while the right adjustable mold cavity encases the first component of the first multi-component product which has been injected into the right adjustable mold cavity in step (d), whereby the first component of the first multi-component product combines with said injected second portion of the second plastic material to thereby cast said first multi-component product;

(m) opening the clamping unit in order to thereby separate the primary right-mold-cavity side and the secondary right-mold-cavity side of the right mold cavity, to open the right adjustable mold cavity; and (n) ejecting the first multi-component product.

12. A method of cyclic injection molding a first multi-component plastic product and a second multi-component plastic product in an injection molding apparatus comprising an injection unit, a common clamping unit, right, center and left molding blocks for defining a right adjustable mold cavity between the right and center molding blocks and a left adjustable mold cavity between the center and left molding blocks, a first and second left runner system for leading plastic molding material from the injection unit to the left adjustable mold cavity, a first and second right runner system for leading plastic molding material from the injection unit to the right adjustable mold cavity, the method comprising the steps of:

(a) adjusting the right mold cavity;

(b) adjusting the left mold cavity;

(c) shutting the common clamping unit to thereby apply clamping force with the common clamping unit on the right and left adjustable mold cavities;

(d) injecting a first portion of a first plastic material by the injection unit into the right adjustable mold cavity, via the first right runner system, to form a first component of the first multi-component product;

(e) injecting a first portion of a second plastic material by the injection unit into the left adjustable mold cavity, via the second left runner system, to form a second component of the second multi-component product while the left adjustable mold cavity encases a first component of the second multi-component product which has been injected into the left adjustable mold cavity in the previous cycle, whereby the first component of the second multi-component product combines with said injected first portion of the second plastic material to thereby cast said second multi-component product;

(f) opening the common clamping unit in order to open the left adjustable mold cavity;

(g) ejecting the second multi-component product;

(h) adjusting the left mold cavity;

(i) adjusting the right mold cavity;

(j) shutting the common clamping unit to thereby apply clamping force with the common clamping unit on the left and right adjustable mold cavities;

(k) injecting a second portion of the first plastic material by the injection unit into the left adjustable mold cavity, via the first left runner system, to form a first component of the second multi-component product and to encase the first component of the second multi-component product in the left mold cavity for employment in step (e) of the succeeding cycle;

(l) injecting a second portion of the second plastic material by the injection unit into the right adjustable mold cavity, via the second right runner system, to form a second component of said first multi-component product while the right adjustable mold cavity encases the first component of the first multi-component product which has been injected into the right adjustable mold cavity ion step (d), whereby the first component of the first multi-component product combines with said injected second portion of the second plastic material to thereby cast said first multi-component product;

(m) opening the common clamping unit in order to open the right adjustable mold cavity; and (n) ejecting the first multi-component product.

13. A method of cyclic injection molding a first multi-component plastic product and a second multi-component plastic product in an injection molding apparatus comprising an injection unit, a right adjustable mold cavity defined by a primary right-mold-cavity side and a secondary right-mold-cavity side, and a left adjustable mold cavity defined by a primary left-mold-cavity side and a secondary left-mold-cavity side, the method comprising the steps of:

(a) injecting a first plastic material into the right adjustable mold cavity to form a first component of a first product in the right adjustable mold cavity, and injecting a second plastic material into an adjusted left adjustable mold cavity to form a second component of a second product in the adjusted left adjustable mold cavity;

(b) adjusting the right adjustable mold cavity to provide an adjusted right adjustable mold cavity defined by the primary right-mold-cavity side and the secondary right-mold-cavity side with the first component of the first product encased in the adjusted right mold cavity, and readjusting the left adjustable mold cavity for forming a first plastic material component of another product in the readjusted left adjustable mold cavity;

(c) injecting a second plastic material into the adjusted right adjustable mold cavity to form a second component of the first product in the adjusted right adjustable mold cavity, and injecting a first plastic material into the readjusted left adjustable mold cavity to form a first component of said another product in the readjusted left adjustable mold cavity; and (d) readjusting the right adjustable mold cavity for forming a first plastic material component of still another product in the readjusted right adjustable mold cavity, and adjusting the left adjustable mold cavity to provide the adjusted left adjustable mold cavity defined by the primary left-mold-cavity side and the secondary left-mold-cavity side with the first component of the second product encased in the adjusted left mold cavity.

14. An apparatus for cyclic injection molding a first multi-component plastic product and a second multi-component plastic product comprising a first injection unit, a second injection unit, a clamping unit, a right adjustable mold cavity with a primary right-mold-cavity side, a secondary right-mold-cavity side and a first moveable barring means, a left adjustable mold cavity with a primary left-mold-cavity side, a secondary left-mold-cavity side and a second moveable barring means, and means for protracting the first barring means;
    means for retracting the second barring means;
    means for shutting the clamping unit to thereby combine the primary right-mold-cavity side and the secondary right-mold-cavity side of the right mold cavity to thereby apply clamping force simultaneously on the right and left adjustable mold cavities;
    means for injecting a first portion of a first plastic material by the first injection unit into the right adjustable mold cavity, when the right adjustable mold cavity has its barring means in the protracted condition;
    means for injecting a first portion of a second plastic material by the second injection unit into the left adjustable old cavity when the second injection unit has its second barring means in the retracted position;
    means for opening the clamping unit in order to thereby separate the primary left-mold-cavity side and the secondary left-mold-cavity side of the left mold cavity, to open the left adjustable mold cavity;
    means for ejecting the second multi-component product;
    means for protracting the second barring means;
    means for retracting the first barring means;
    means for shutting the clamping unit to thereby combine the primary left-mold-cavity side and the secondary left-mold-cavity side of the left mold cavity to thereby apply clamping force simultaneously on the right and left adjustable mold cavities;
    means for injecting a second portion of the first plastic material by the first injection unit into the left adjustable mold cavity, when the left adjustable mold cavity has its second barring means in the protracted position;
    means for injecting a second portion of the second plastic material by the second injection unit into the right adjustable mold cavity when the right adjustable mold cavity has its first barring means in the retracted position;
    means for opening the clamping unit in order to thereby separate the primary right-mold-cavity side and the secondary right-mold-cavity side of the right mold cavity, to open the right adjustable mold cavity; and
    means for ejecting the first multi-component product.

15. An apparatus for cyclic injection molding a first multi-component plastic product and a second multi-component plastic product, wherein the injection molding apparatus comprises right, center and left molding blocks for defining a right adjustable mold cavity between the right and center molding blocks and a left adjustable mold cavity between the center and left molding blocks, a first injection unit, a second injection unit, a clamping unit, a first moveable barring means for the right adjustable mold cavity, and a second moveable barring means for the left adjustable mold cavity, and means for protracting the first barring means;
    means for retracting the second barring means;
    means for shutting the clamping unit to thereby apply clamping force simultaneously on the right and left adjustable mold cavities;
    means for injecting a first portion of a first plastic material by the first injection unit into the right adjustable mold cavity, when the right adjustable mold cavity has its first barring means in the protracted condition;
    means for injecting a first portion of a second plastic material by the second injection unit into the left adjustable mold cavity when the second injection unit has its second barring means in the retracted position;
    means for opening the clamping unit in order to open the left adjustable old cavity;
    means for ejecting the second multi-component product;
    means for protracting the second barring means;
    means for retracting the first barring means;
    means for injecting a second portion of the first plastic material by the first injection unit into the left adjustable mold cavity when the left adjustable mold cavity has its second barring means in the protracted position;
    means for injecting a second portion of the second plastic material by the second injection unit into the right adjustable mold cavity when the right adjustable mold cavity has its first barring means in the retracted position;
    means for opening the clamping unit in order to open the right adjustable mold cavity;
    means for ejecting the first multi-component product;
    means for moving relatively the right and left molding blocks together; and
    means for moving relatively the right and left molding blocks apart.

16. An apparatus for cyclic injection molding a first multi-component plastic product and a second multi-component plastic product, wherein the injection molding apparatus comprises right, center and left molding blocks for defining a right adjustable mold cavity between the right and center molding blocks and a left adjustable mold cavity between the center and left molding blocks, a first injection unit, a second injection unit, a clamping unit, a first moveable barring means for the right adjustable mold cavity, and a second moveable barring means for the left adjustable mold cavity, and means for protracting the first barring means;
    means for retracting the second barring means;
    means for shutting the clamping unit to thereby apply clamping force simultaneously on the right and left adjustable mold cavities;
    means for injecting a first portion of a first plastic material by the first injection unit into the right adjustable mold cavity, when the right adjustable mold cavity has its first barring means in the protracted condition;
    means for injecting a first portion of a second plastic material by the second injection unit into the left adjustable mold cavity when the second injection unit has its second barring means in the retracted position;
    means for opening the clamping unit in order to open the left adjustable mold cavity;
    means for ejecting the second multi-component product;
    means for protracting the second barring means;
    means for retracting the first barring means;
    means for injecting a second portion of the first plastic material by the first injection unit into the left adjustable mold cavity when the left adjustable mold cavity has its second barring means in the protracted position;

means for injecting a second portion of the second plastic material by the second injection unit into the right adjustable mold cavity when the right adjustable mold cavity has its first barring means in the retracted position;

means for opening the clamping unit in order to open the right adjustable mold cavity;

means for ejecting the first multi-component product;

right locking means for locking and unlocking the right molding block to the center molding block; and left locking means for locking and unlocking the center molding block to the left molding block.

17. An apparatus for cyclic injection molding a first multi-component plastic product and a second multi-component plastic product comprising a first injection unit, a second injection unit, a common clamping unit, right, center and left molding blocks for defining a right adjustable mold cavity between the right and center molding blocks and a left adjustable mold cavity between the center and left molding blocks, the center block comprising a first left runner system for leading plastic molding material from the first injection unit to the left adjustable mold cavity, a first right runner system for leading plastic molding material from the first injection unit to the right adjustable mold cavity, a second left runner system for leading plastic molding material from the second injection unit to the left adjustable mold cavity, a second right runner system for leading plastic molding material from the second injection unit to the right adjustable mold cavity, and means for adjusting the right mold cavity;

means for adjusting the left mold cavity;

means for shutting the common clamping unit in order to apply clamping force with the common clamping unit on the right and left adjustable mold cavities;

means for injecting a first portion of a first plastic material by the first injection unit into the right adjustable mold cavity, via the first right runner system;

means for injecting a first portion of a second plastic material by the second injection unit into the left adjustable mold cavity, via the second left runner system;

means for opening the common clamping unit in order to open the left adjustable mold cavity;

means for ejecting the second multi-component product;

means for readjusting the left mold cavity;

means for readjusting the right mold cavity;

means for injecting a second portion of the first plastic material by the first injection unit into the left adjustable mold cavity, via the first left runner system;

means for injecting a second portion of the second plastic material by the second injection unit into the right adjustable mold cavity, via the second right runner system;

means for opening the common clamping unit in order to open the right adjustable mold cavity; and means for ejecting the first multi-component product.

18. An apparatus according to claim 17, wherein the injection molding apparatus comprises right locking means for locking and unlocking the right molding block to the center molding block and left locking means for locking and unlocking the center molding block to the left molding block.

19. An apparatus for cyclic injection molding a first multi-component plastic product and a second multi-component plastic product comprising an injection unit, a clamping unit, a right adjustable mold cavity with a primary right-mold-cavity side, a secondary right-mold-cavity side and a first moveable barring means, a left adjustable mold cavity with a primary left-mold-cavity side, a secondary left-mold-cavity side and a second moveable barring means, and means for protracting the first barring means;

means for retracting the second barring means;

means for shutting the clamping unit to thereby combine the primary right-mold-cavity side and the secondary right-mold-cavity side of the right mold cavity to thereby apply clamping force simultaneously on the right and left adjustable mold cavities;

means for injecting a first portion of a first plastic material by the injection unit into the right adjustable mold cavity, when the right adjustable mold cavity has its first barring means in the protracted condition;

means for injecting a first portion of a second plastic material by the injection unit into the left adjustable mold cavity when the second injection unit has its second barring means in the retracted position;

means or opening the clamping unit in order to thereby separate the primary left-mold-cavity side and the secondary left-mold-cavity side of the left mold cavity, to open the left adjustable mold cavity;

means for ejecting the second multi-component product;

means for protracting the second barring means;

means for retracting the first barring means;

means for shutting the clamping unit to thereby combine the primary left-mold-cavity side and the secondary left-mold-cavity side of the left mold cavity to thereby apply clamping force simultaneously on the right and left adjustable mold cavities;

means or injecting a second portion of the first plastic material by the injection unit into the left adjustable mold cavity, when the left adjustable mold cavity has its second barring means in the protracted position;

means for injecting a second portion of the second plastic material by the injection unit into the right adjustable mold cavity when the right adjustable mold cavity has its first barring means in the retracted position;

means for opening the clamping unit in order to thereby separate the primary right-mold-cavity side and the secondary right-mold-cavity side of the right mold cavity, to open the right adjustable mold cavity; and means for ejecting the first multi-component product.

20. An apparatus for cyclic injection molding a first multi-component plastic product and a second multi-component plastic product comprising a injection unit, a common clamping unit, right, center and left molding blocks for defining a right adjustable mold cavity between the right and center molding blocks and a left adjustable mold cavity between the center and left molding blocks, the center block comprising a first and second left runner system for leading plastic molding material from the injection unit to the left adjustable mold cavity, a first and second right runner system for leading plastic molding material from the injection unit to the right adjustable mold cavity, and means for adjusting the right mold cavity;

means for adjusting the left mold cavity;

means for shutting the common clamping unit in order to apply clamping force with the common clamping unit on the right and left adjustable mold cavities;

means for injecting a first portion of a first plastic material by the injection unit into the right adjustable mold cavity, via the first right runner system;

means for injecting a first portion of a second plastic material by the injection unit into the left adjustable mold cavity, via the second left runner system;

means for opening the common clamping unit in order to open the left adjustable mold cavity;

means for ejecting the second multi-component product;

means for readjusting the left mold cavity;

means for readjusting the right mold cavity;

means for injecting a second portion of the first plastic material by the injection unit into the left adjustable mold cavity, via the first left runner system;

means for injecting a second portion of the second plastic material by the injection unit into the right adjustable mold cavity, via the second right runner system;

means for opening the common clamping unit in order to open the right adjustable mold cavity; and means for ejecting the first multi-component product.

21. A apparatus for cyclic injection molding a first multi-component plastic product ad a second multi-component plastic product, comprising a right adjustable mold cavity defined by a primary right-mold-cavity side and a secondary right-mold-cavity side, a left adjustable mold cavity defined by a primary left-mold-cavity side and a secondary left-mold-cavity side;

means for injecting a first plastic material into the right adjustable mold cavity to form a first component of a first product in the right adjustable mold cavity, and for injecting a second plastic material into an adjusted left adjustable mold cavity to form a second component of a second product in the adjusted left adjustable mold cavity, means or adjusting the right adjustable mold cavity to provide an adjusted right adjustable mold cavity defined by the primary right-mold-cavity side and the secondary right-mold-cavity side with the first component of the first product encased in the adjusted right mold cavity, and for readjusting the left adjustable mold cavity for forming a first plastic material component of another product in the readjusted left adjustable mold cavity;

means for injecting a second plastic material into the adjusted right adjustable mold cavity to form a second component of the first product in the adjusted right adjustable mold cavity, and for injecting a first plastic material into the readjusted left adjustable mold cavity to form a first component of said another product in the readjusted left adjustable mold cavity; and means for readjusting the right adjustable mold cavity for forming a first plastic material component of still another product in the readjusted right adjustable mold cavity, and for adjusting the left adjustable mold cavity to provide the adjusted left adjustable mold cavity defined by the primary left-mold-cavity side and the secondary left-mold-cavity side with the first component of the second product encased in the adjusted left mold cavity.

* * * * *